(12) United States Patent
Kazuyoshi et al.

(10) Patent No.: US 8,233,124 B2
(45) Date of Patent: Jul. 31, 2012

(54) LIQUID CRYSTAL DISPLAY DEVICE

(75) Inventors: Nagayama Kazuyoshi, Yokohama (JP); Momoi Yuichi, Yokohama (JP)

(73) Assignee: LG Display Co., Ltd., Seoul (KR)

( * ) Notice: Subject to any disclaimer, the term of this patent is extended or adjusted under 35 U.S.C. 154(b) by 1348 days.

(21) Appl. No.: 11/646,595

(22) Filed: Dec. 28, 2006

(65) Prior Publication Data

US 2007/0176872 A1  Aug. 2, 2007

(30) Foreign Application Priority Data

Dec. 28, 2005 (JP) ............... P 2005-377201
Dec. 28, 2005 (JP) ............... P 2005-377203
Dec. 28, 2005 (JP) ............... P 2005-377204

(51) Int. Cl.
*G02F 1/1337* (2006.01)
*G02F 1/1343* (2006.01)

(52) U.S. Cl. ................ 349/141; 349/129
(58) Field of Classification Search ........... 349/141, 349/129
See application file for complete search history.

(56) References Cited

U.S. PATENT DOCUMENTS

| | | | |
|---|---|---|---|
| 5,162,933 A | 11/1992 | Kakuda et al. | |
| 5,317,433 A | 5/1994 | Miyawaki et al. | |
| 5,339,181 A | 8/1994 | Kim et al. | |
| 5,462,887 A | 10/1995 | Glück | |
| 5,668,379 A | 9/1997 | Ono et al. | |
| 5,731,856 A | 3/1998 | Kim et al. | |
| 5,771,083 A | 6/1998 | Fujihara et al. | |
| 5,793,460 A | 8/1998 | Yang | |
| 5,847,781 A | 12/1998 | Ono et al. | |
| 2004/0046903 A1 * | 3/2004 | Matsumoto et al. | 349/43 |
| 2004/0263748 A1 * | 12/2004 | Park et al. | 349/141 |
| 2006/0109224 A1 * | 5/2006 | Chang et al. | 345/89 |

FOREIGN PATENT DOCUMENTS

| | | |
|---|---|---|
| CN | 1621928 A | 6/2005 |
| JP | 2-301726 A | 12/1990 |
| JP | 4-77783 A | 3/1992 |
| JP | 5-72529 | 3/1993 |
| JP | 8-30244 A | 2/1996 |
| JP | 2005-196118 | 7/2005 |
| JP | 2005-309052 | 11/2005 |
| JP | 2005-338388 A | 12/2005 |

* cited by examiner

*Primary Examiner* — Mark Robinson
*Assistant Examiner* — Charles Chang
(74) *Attorney, Agent, or Firm* — McKenna Long & Aldridge, LLP

(57) ABSTRACT

A liquid crystal display device is disclosed, which can control a viewing angle in vertical and horizontal directions without forming a specific liquid crystal display panel, the liquid crystal display device comprising a display screen including a plurality of color pixels and liquid crystal molecules; and a viewing-angle control pixel controlling the liquid crystal molecules, an alignment direction of the liquid crystal molecules being inclined to a vertical or horizontal direction in the display screen, wherein the viewing-angle control pixel is formed independently of RGB pixels, to thereby control the viewing angle in the horizontal and vertical directions.

23 Claims, 14 Drawing Sheets

Common Electrode

Pixel Electrode

R  G  B  20

11  11  11  21a

▨ Common Electrode
▦ Pixel Electrode

SXGA (1280*3*1024)

SXGA (1280*4*1024)

Case of black pixel

Case of white pixel

LIQUID CRYSTAL DISPLAY DEVICE

This application claims the benefit of the Japanese Patent Application Nos. P2005-377201, P2005-377203 and P2005-377204, filed on Dec. 28, 2005, all of which are hereby incorporated by reference for all purposes as if fully set forth herein.

BACKGROUND OF THE INVENTION

1. Field of the Invention

The present invention relates to a liquid crystal display (LCD) device which can control a viewing angle.

2. Discussion of the Related Art

Liquid crystal displays, especially, liquid crystal displays using thin film transistors (TFT) as switching devices have been widely used in various applications from mobile phones to large-sized televisions.

In practice, it has been preferable to provide an LCD device having a wide-viewing angle, of which display information can be viewed by a large number of persons.

More recently, there has been proposed a display having the secret mode (for example, Japanese Unexamined Publication No. 5-72529).

FIG. 13 is a view of illustrating a related art LCD device having a secret mode.

Referring to FIG. 13, when using a backlight that emits light to the rear surface of a liquid crystal display panel, the backlight necessarily requires the high directivity.

Between the common liquid crystal display panel and the backlight having the high directivity, there is another liquid crystal display panel for switching between a scattered state and an unscattered state, for example, a polymer dispersed type liquid crystal display panel (a scattering-unscattering switching layer).

When the scattering-unscattering switching layer is in an unscattered state, the light emitted from the backlight proceeds only to the front direction. Thus, if the person is positioned at the side of the liquid crystal display panel, it is impossible for the person positioned at the side to view the displayed image.

On the other hand, if the scattering-unscattering switching layer is in a scattered state, the light emitted from the backlight proceeds to the side directions as well as the front direction. Thus, even though the person is positioned at the side of the liquid crystal display panel, it is possible to view the displayed image. Consequently, a large number of persons can view the image displayed on the liquid crystal display panel.

In this case, it is necessary to fabricate a specific liquid crystal display panel that is different from the common liquid crystal display panel. Therefore, the manufacturing costs are increased.

In order to solve this problem, there has been proposed a related art Fringe Field Switching (FFS) mode LCD device provided with a common electrode having a shape of "<", to realize a wide viewing angle.

FIG. 14 is a plan view of illustrating each of RGB pixels for a related art FFS mode LCD device. FIGS. 15A and 15B are views of illustrating the operation of liquid crystal molecules according as the voltage is applied to a related art FFS mode LCD device or not.

As illustrated in FIG. 14, the related art FFS mode LCD device includes a common electrode which is formed in shape of "<", so as to regulate the inclination direction of liquid crystal.

As illustrated in FIG. 15A, if the voltage is not applied to the LCD device, the liquid crystal molecules are aligned in the vertical direction. If the voltage is applied to the LCD device, the liquid crystal molecules are inclined in the predetermined direction based on the effect of the electric field inclined by the common electrode, that is, the direction substantially perpendicular to the extending direction of the common electrode, as illustrated in FIG. 15B. As a result, the liquid crystal molecules are inclined to the two directions corresponding to the "<" shape, whereby the LCD device has the good viewing angle.

However, the related art LCD device has the following problems.

Even though the visibility for the specific direction in the LCD device can be improved resulting from the "<"-shaped common electrode, it is impossible to obtain the display of confidentiality on demand

SUMMARY OF THE INVENTION

Accordingly, the present invention is directed to a Fringe Field Switching (FFS) mode LCD that which substantially obviates one or more problems due to limitations and disadvantages of the related art.

An advantage of the present invention is to provide an FFS mode LCD device that can control a viewing angle in vertical and horizontal directions without forming a specific liquid crystal display panel of a predetermined structure.

To achieve these and other advantages and in accordance with the purpose of the invention, as embodied and broadly described herein, a liquid crystal display device comprises a display screen including a plurality of color pixels and liquid crystal molecules; and a viewing-angle control pixel controlling the liquid crystal molecules, an alignment direction of the liquid crystal molecules being inclined to a vertical or horizontal direction in the display screen.

At this time, a viewing-angle control signal is commonly applied to the plurality of viewing-angle control pixels in the display screen without a switching element.

In addition, the LCD device includes a viewing-angle control voltage adjuster which adjusts a center value of the viewing-angle control signal to be substantially identical to a common voltage of the color pixel.

Furthermore, the LCD device includes a color pixel driver which applies the signal to the color pixel, and is formed at one side of the display screen; and a viewing-angle control pixel driver which applies the signal to the viewing-angle control pixel, and is formed at the other side of the display screen.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

Hereinafter, an LCD device according to the present invention will be described with reference to the accompanying drawings.

Figure 1:
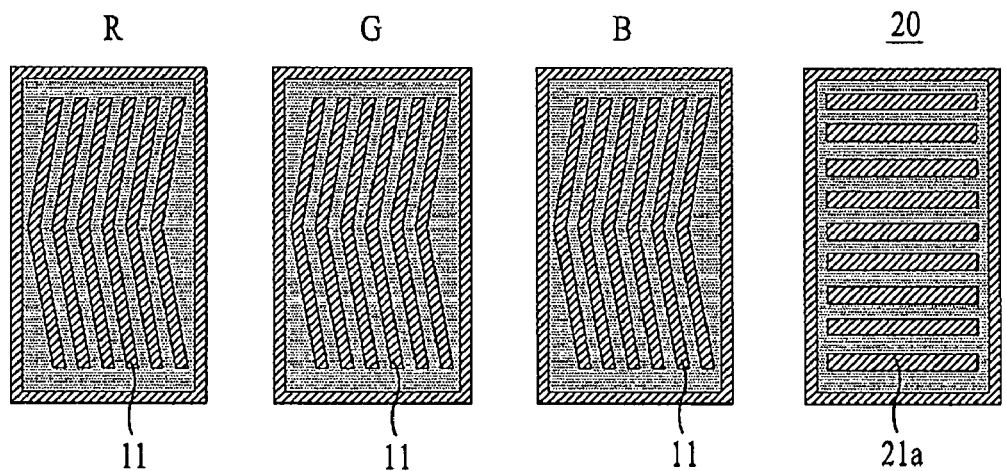
FIG. 1 is a plan view illustrating each of RGB pixels and a viewing-angle control pixel in an LCD device according to one embodiment of the present invention.

FIG. 1 is a plan view illustrating each of RGB and viewing-angle control pixels in an LCD device according to one preferred embodiment of the present invention.

As shown in FIG. 1, each of RGB pixels is formed in a Fringe Field Switching (FFS) mode. Each of the RGB pixels is provided with a pixel electrode and a common electrode 11, wherein the common electrode 11 is interposed between the pixel electrode and an insulation layer. Each of the RGB pixels includes the common electrode 11 which is formed in shape of "<".

In addition to the RGB pixels, a viewing-angle control pixel 20 is formed to control a viewing angle. The viewing-angle control pixel 20 is controlled such that the liquid crystal molecules are inclined to the horizontal (left and down) or vertical (up and down) direction. In this case, a control voltage is applied to the viewing-angle control pixel 20 through a viewing-angle control line (not shown), which is formed separately.

The viewing-angle control pixel 20 includes a pixel electrode, and a common electrode 21a formed in the horizontal (left and right) direction or a common electrode 21b (see FIG. 4B) formed in the vertical (up and down) direction, which are provided in the FFS mode. FIG. 1 illustrates the common electrode 21a in the horizontal (left and right) direction. If the control voltage is applied to the viewing-angle control pixel 20 through the viewing-angle control line, the liquid crystal molecules are inclined to the vertical (up and down) or horizontal (left and right) direction, thereby controlling the viewing angle.

As illustrated in FIG. 1, the viewing-angle control pixel 20 is supplied with the control voltage through the viewing-angle control line, wherein the additional viewing-angle control line is separated from a power-supplying line for the RGB pixels. At this time, the viewing-angle control line corresponds to an independent common line for the viewing-angle control pixel 20, wherein the viewing-angle control line may be formed of a transparent electrode, thereby improving an aperture ratio. Also, the common line is formed separately, so that it is possible to apply a voltage having a predetermined wavelength to the viewing-angle control pixel 20.

Also, the viewing-angle control pixel 20 does not directly contribute to the actual display of an image. That is, the viewing-angle control pixel 20 is provided such that, for example, when a voltage is applied thereto, it is difficult to recognize the display information. Consequently, it is unnecessary to form a coloring layer corresponding to the viewing-angle control pixel 20, for example, on a color filter substrate opposite the viewing angle control pixel 20.

An operation of the liquid crystal molecules in the viewing-angle control pixel 20 when the voltage is applied or not will be explained as follows.

Figure 2A:
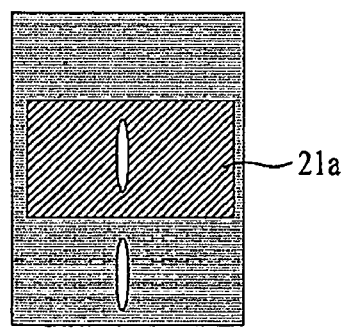
FIGS. 2A and 2B are views for explaining the operation of liquid crystal molecules in a viewing-angle control pixel illustrated in FIG. 1.
Figure 2B:
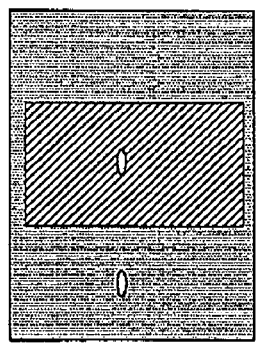

FIGS. 2A and 2B are views of illustrating the operation of liquid crystal molecules in the viewing-angle control pixel 20 having the common electrode 21 in the horizontal (left and right) direction illustrated in FIG. 1.

As illustrated in FIG. 2A, if the voltage is not applied to the viewing-angle control pixel 20 having the common electrode 21a in the horizontal (left and right) direction, the liquid crystal molecules are aligned in horizontal state, whereby the viewing-angle control pixel 20 is displayed as the black, that is, the whole display is not affected. This is identical in the front viewing angle, the vertical (up and down) and horizontal (left and right) viewing angles, and the inclined viewing angle. All of the display by the RGB pixels is normally used.

If the voltage is applied to the viewing-angle control pixel 20 having the common electrode 21a of the horizontal (left and right) direction, as illustrated in FIG. 2B, the liquid crystal molecules move vertically in the central portion of the common electrode 21a, and in the central portion between each of the common electrodes 21a. Consequently, when the viewing-angle control pixel 20 is viewed in the horizontal (left and right) direction, bright light is transmitted through the common electrode 21a in the horizontal (left and right) direction. On the other hand, when the viewing-angle control pixel 20 is viewed in the vertical (up and down) direction, light is not transmitted through the common electrode 21a in the horizontal (left and right) direction.

Figure 4A:
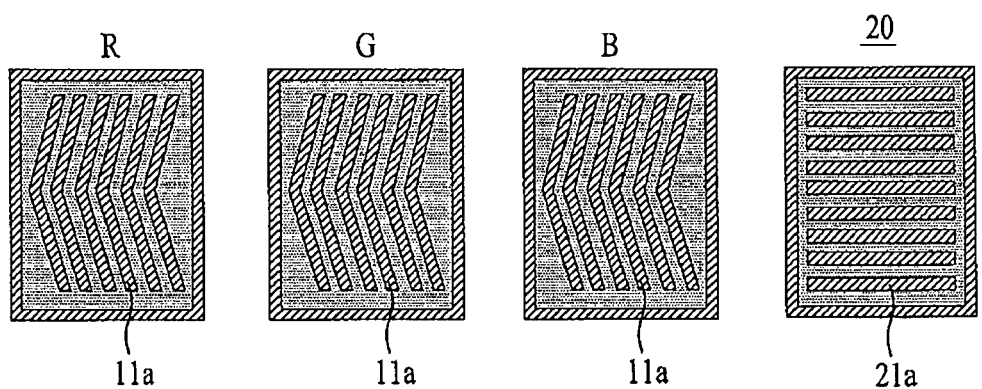
FIGS. 4A and 4B are another plan views illustrating each of RGB pixels and a viewing-angle control pixel in an LCD device according to an embodiment of the present invention.
Figure 4B:
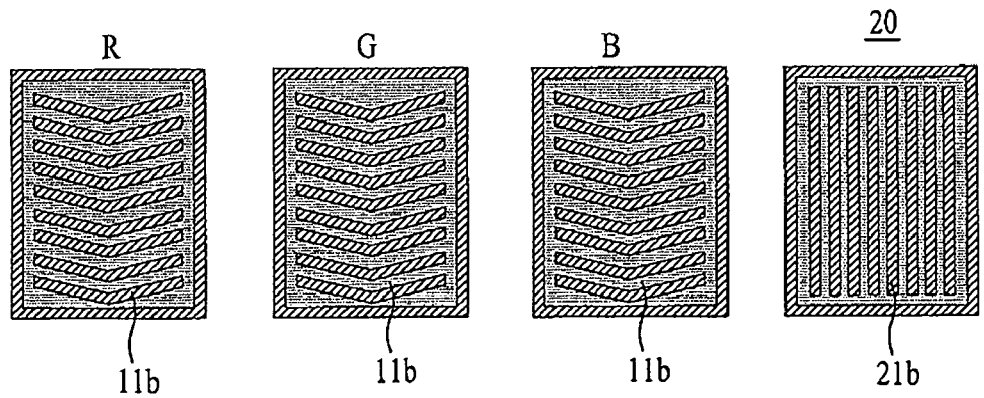

Meanwhile, when the voltage is applied to the viewing-angle control pixel 20 having the common electrode 21b of the vertical (up and down) direction, as shown in FIG. 4B, the liquid crystal molecules move vertically in the direction, which is different by 90 degrees from the direction illustrated in FIG. 2B, in the central portion of the common electrode 21b, and in the central portion between each of the common electrode 21b. Accordingly, when the viewing-angle control pixel 20 is viewed in the horizontal (left and right) direction, bright light is not transmitted through the common electrode 21b of the vertical (up and down) direction. On the other hand, when the viewing-angle control pixel 20 is viewed in the vertical (up and down) direction, the light is transmitted through the common electrode 21b in the horizontal (left and right) direction.

As a result, on the viewing angle from the horizontal (left and right) direction in state of that the voltage is applied to the viewing-angle control pixel 20, the viewing-angle control area having the common electrode 21a in the horizontal (left and right) direction is recognized as white, and the viewing-angle control area having the common electrode 21b in the vertical (up and down) direction is recognized as black.

On the viewing angle from the vertical direction, the viewing-angle control area having the common electrode 21a in the horizontal (left and right) direction is recognized as black, and the viewing-angle control area having the common electrode 21b in the vertical (up and down) direction is recognized as white.

Also, these patterns may overlap with the common display pattern of the RGB pixels when viewed from the horizontal (left and right) and vertical (up and down) directions. Consequently, when the patterns are viewed in the horizontal (left and right) direction and the vertical (up and down) directions, it is impossible to recognize what is written, thereby obtaining the confidentiality of displayed information.

As described above, the viewing-angle control pixel 20 corresponding to each of the RGB pixels includes one of the common electrode 21a in the horizontal (left and right) direction and the common electrode 21b in the vertical (up and down) direction. Thus, it is possible to brighten the display in the horizontal (left and right) or vertical (up and down) viewing direction by applying the voltage to the viewing-angle control pixel 20, thereby providing a display with the desired confidentiality when viewed from at the vertical and horizontal directions while the display can be viewed from the front direction.

Figure 3:
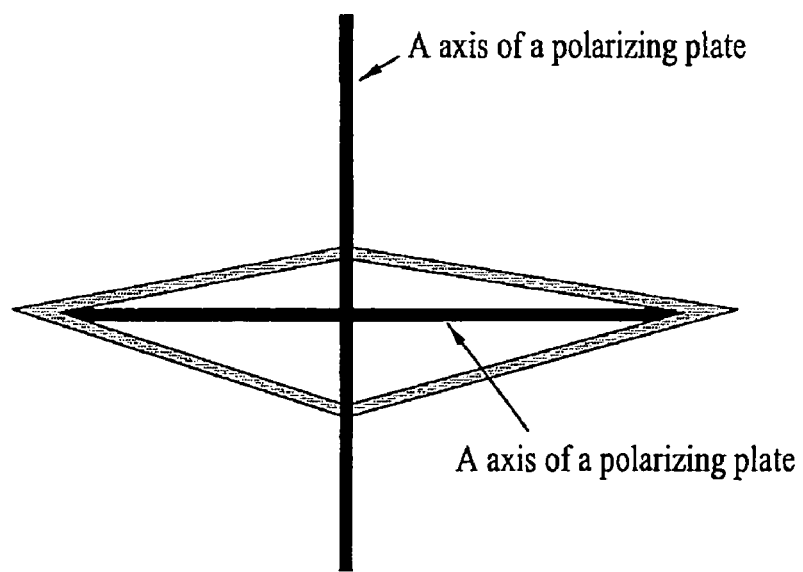
FIG. 3 is a view illustrating the luminance distribution of viewing-angle dependency based on the application of voltage in a viewing-angle control pixel according to an embodiment of the present invention.

FIG. 3 is a view illustrating the luminance distribution of viewing-angle dependency based on the application of voltage in the viewing-angle control pixel according to an embodiment of the present invention. FIG. 3 illustrates the case where the viewing-angle control pixel 20 has the common electrode 21a in the horizontal (left and right) direction illustrated in FIG. 1.

If the voltage is not applied to the viewing-angle control pixel 20, the luminance of the inclined direction from the front direction and side direction of horizontal (left and right) and vertical (up and down) directions corresponds to black. If voltage is applied to the viewing-angle control pixel 20, the front is black, and the light is transmitted in the horizontal (left and right) and the vertical (up and down) directions.

As a result, the light is transmitted to the side directions of the horizontal (left and right) and the vertical (up and down) directions. Thus, the person is positioned at the side direction of the horizontal (left and right) and the vertical (up and down) directions of the device, it is difficult to recognize the image displayed on the panel, thereby obtaining the confidentiality of displayed information.

FIGS. 4A and 4B are plan views illustrating each of RGB and viewing-angle control pixels in an LCD device according to an embodiment of the present invention.

Each of the RGB and viewing-angle control pixels is identical in structure to each of those shown in FIG. 1. In FIG. 4A, each of the RGB pixels includes a common electrode 11a formed in shape of "<", to improve the visibility in the horizontal (left and right) direction. In addition, as a voltage is applied to a common electrode 21a in a horizontal (left and right) direction in the viewing-angle control pixel 20, it is possible to obtain the confidentiality of displayed information when viewed from the horizontal (left and right) direction.

The RGB and viewing-angle control pixels illustrated in FIG. 4B have the visibility and secret mode which are different by 90 degrees from those of FIG. 4A.

In FIG. 4B, each of the RGB pixels includes a common electrode 21b formed in shape of "V" to thereby improve the visibility in the vertical (up and down) direction. As a voltage is applied to a common electrode 21b in a vertical (up and down) direction in the viewing-angle control pixel 20, it is possible to obtain the confidentiality of displayed information in the vertical (up and down) direction.

Figure 5:
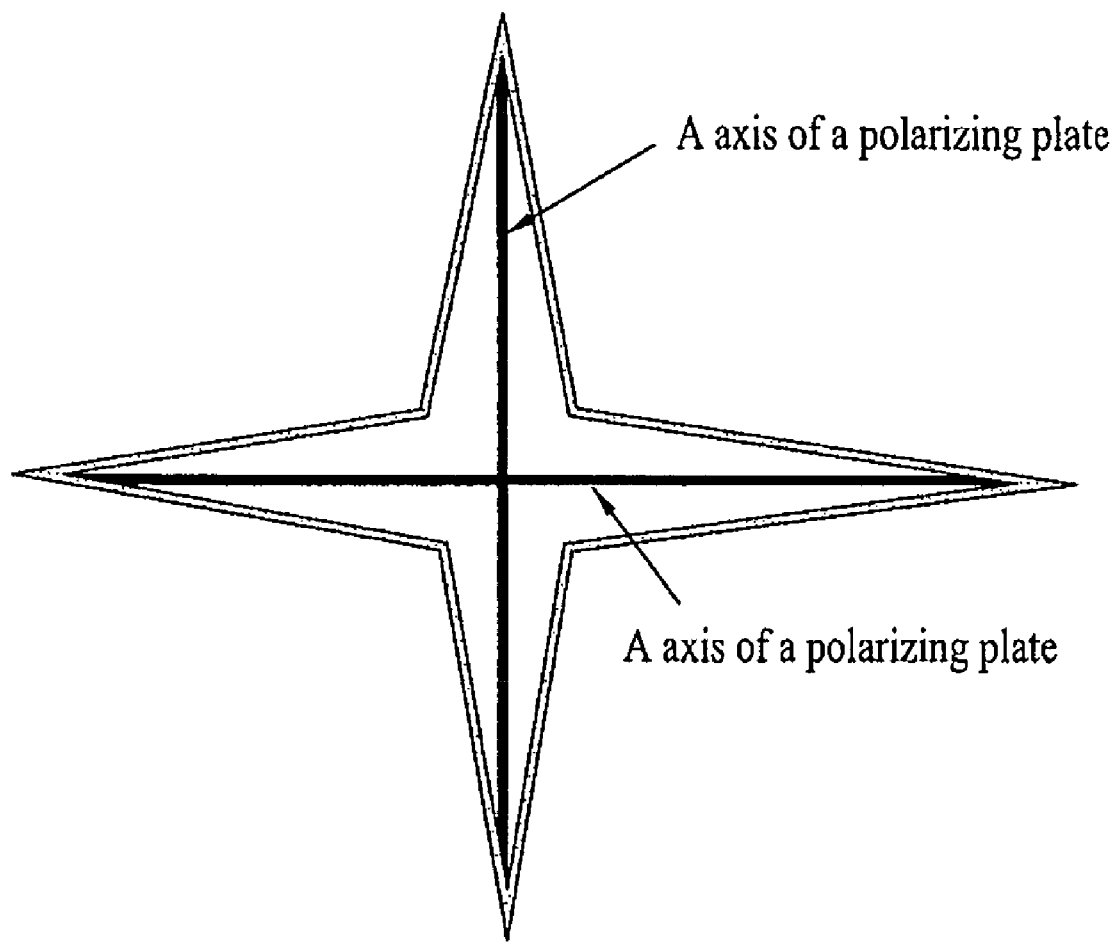
FIG. 5 is another view illustrating the luminance distribution of viewing-angle dependency based on the application of voltage in a viewing-angle control pixel according to an embodiment of the present invention.

FIG. 5 is a view illustrating the luminance distribution of viewing-angle dependency when the voltage is applied to the viewing-angle control pixel 20 or not.

FIG. 5 illustrates the case where the viewing-angle control pixel 20 having the common electrode 21a in the horizontal (left and right) direction illustrated in FIG. 4A and the viewing-angle control pixel 20 having the common electrode 21b of the vertical (up and down) direction illustrated in FIG. 4B are used together. If the voltage is not applied to the viewing-angle control pixel 20, the luminance of the inclined direction from the front direction and side direction of horizontal (left and right) and vertical (up and down) directions corresponds to black.

If the voltage is applied to the viewing-angle control pixel 20, the front black, and the light is transmitted in the inclined direction of the horizontal (left and right) and vertical (up and down) directions. As a result, when it is viewed from the horizontal (left and right) and vertical (up and down) directions, it is impossible to recognize what is written, thereby obtaining the confidentiality of displayed information.

By arranging the viewing-angle control pixel having the common electrode 21a in the horizontal (left and right) direction and the viewing-angle control pixel having the common electrode 21b in the vertical (up and down) direction on the display screen, it is possible to realize the LCD device having the confidentiality of information. For example, the viewing-angle control pixel having the common electrode 21a in the horizontal (left and right) direction and the viewing-angle control pixel having the common electrode 21b in the vertical (up and down) direction are arranged so as to form a predetermined shape on the display screen.

As mentioned above, the viewing-angle control pixel is formed independently of the RGB pixels, so that it is possible to obtain the LCD device that can control the viewing angle in the vertical (up and down) and horizontal (left and right) directions. Furthermore, the viewing-angle control pixel having the common electrode 21a in the horizontal (left and right) direction and the viewing-angle control pixel having the common electrode 21b in the vertical (up and down) direction are appropriately arranged on the display screen, it is possible to realize the LCD device having the confidentiality of information.

Also, it is unnecessary to form a color layer in a color filter substrate side opposite to the viewing-angle control pixel, thereby decreasing the fabrication cost.

Figure 6:
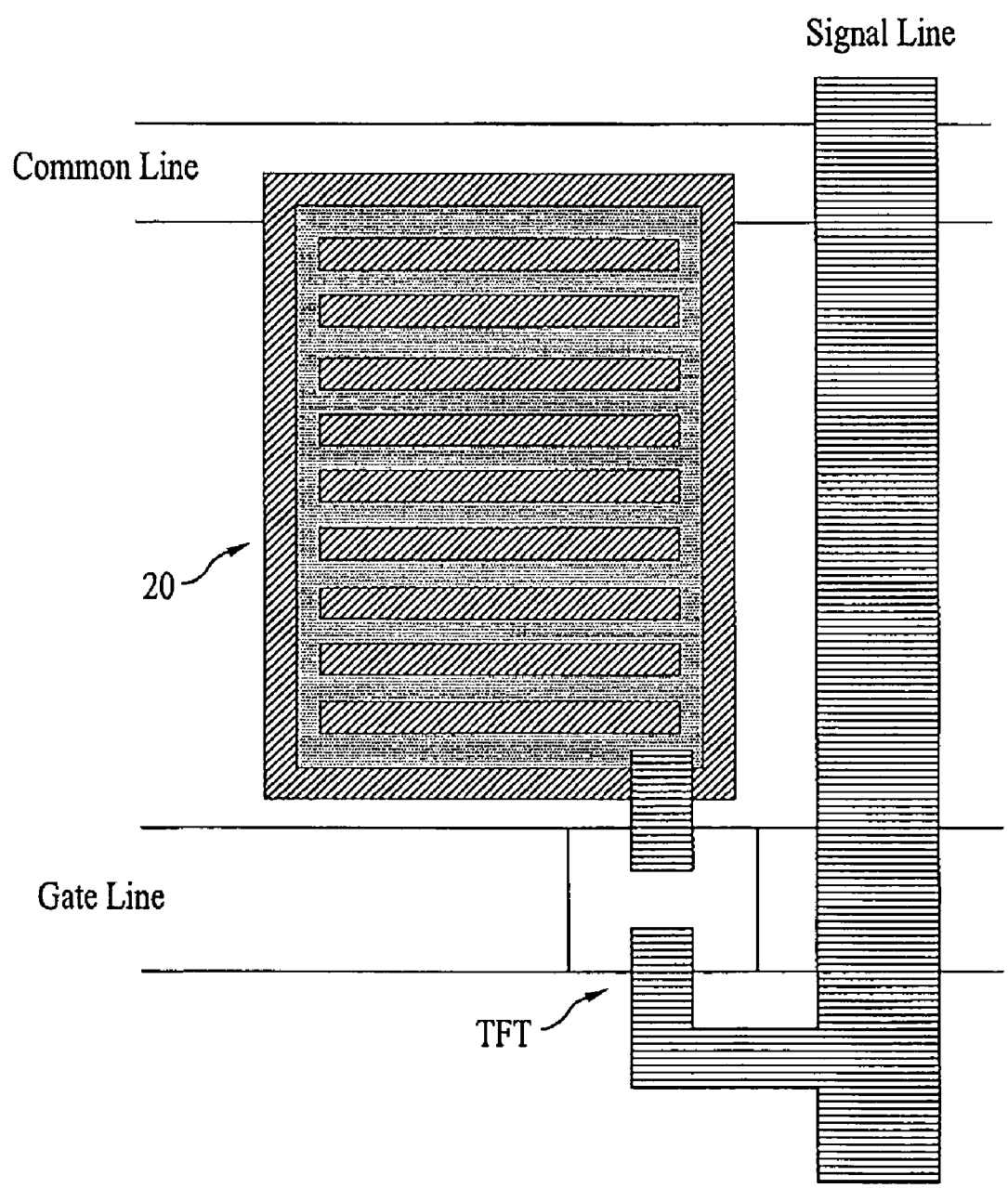
FIG. 6 is an expanded plan view of a viewing-angle control pixel illustrated in FIG. 1.

FIG. 6 is an expanded plan view of the viewing-angle control pixel illustrated in FIG. 1. At this time, the voltage is applied to the viewing-angle control pixel 20 illustrated in FIG. 6 through the switching element (thin film transistor, TFT).

Figure 7:
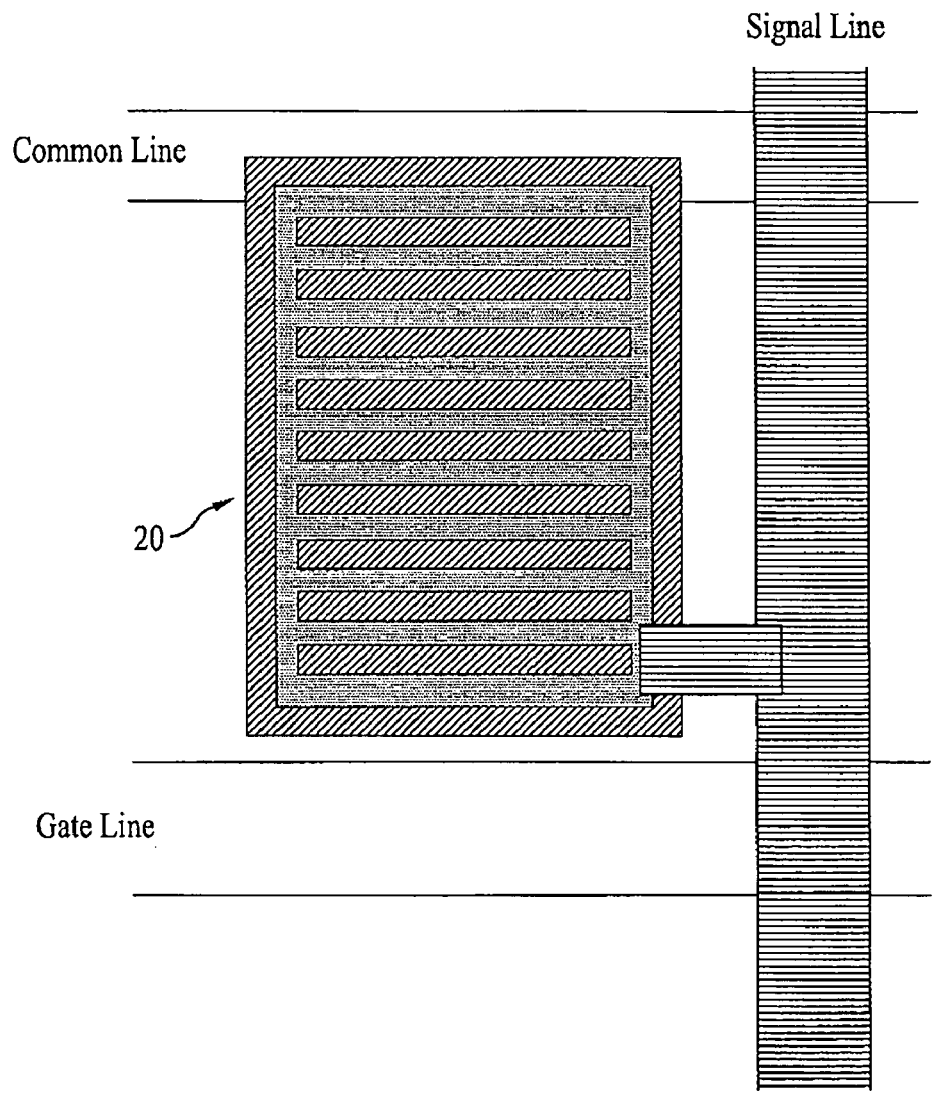
FIG. 7 is another expanded plan view of a viewing-angle control pixel shown in FIG. 1.

FIG. 7 is another expanded plan view of the viewing-angle control pixel illustrated in FIG. 1. If trying to obtain the confidentiality of displayed information on the entire display screen, the voltage is commonly applied to each of the viewing-angle control pixels 20 without the switching control. Accordingly, each viewing-angle control pixel 20 illustrated in FIG. 7 is directly connected to the signal line without the switching element (TFT).

Figure 8:
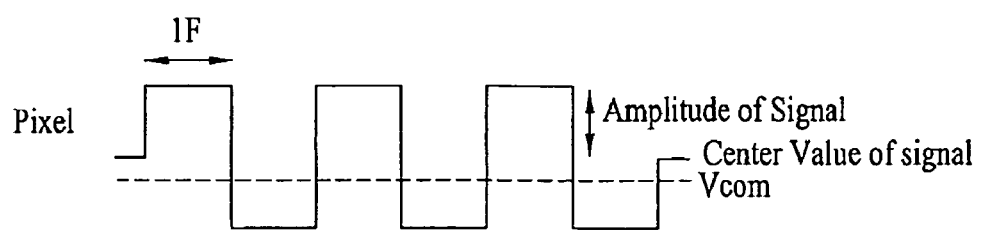
FIG. 8 illustrates the relation between a common voltage (Vcom) and an AC-applying voltage of each of RGB pixels.

FIG. 8 illustrates the relation between a common voltage (Vcom) and an AC voltage of each of RGB pixels. Based on amplitude of signal, the voltage is applied to the viewing-angle control pixel.

After the voltage signal is applied to each of the RGB pixels, the voltage falls due to the effect the switching element (TFT). Accordingly, as illustrated in FIG. 8, the common voltage (Vcom) is smaller than a center value of the applied voltage signal.

As illustrated in FIG. 7, there is no necessity for providing a switching element (TFT) to the viewing-angle control pixel 20. Thus, the viewing-angle control pixel 20 has no voltage caused by TFT in the RGB pixels. As a result, an optimal common voltage for the viewing-angle control pixel 20 is different from an optimal common voltage for the RGB pixels.

However, if the RGB pixels and the viewing-angle control pixel have the different common voltages, blurring images may occur. Accordingly, the LCD device of the present invention includes a viewing-angle control voltage adjuster that adjusts the signal center value of the viewing-angle control pixel 20 to be the same as the common voltage of the RGB pixels.

That is, the viewing-angle control voltage adjuster reads out the common voltage of each of the RGB pixels; adjusts the center value of the voltage signal applied to the viewing-angle control pixel 20 to be substantially identical to the common voltage of the RGB pixel; and outputs the applying voltage signal. As a result, the LCD device of the present invention can prevent the blurring images from occurring.

Figure 9:
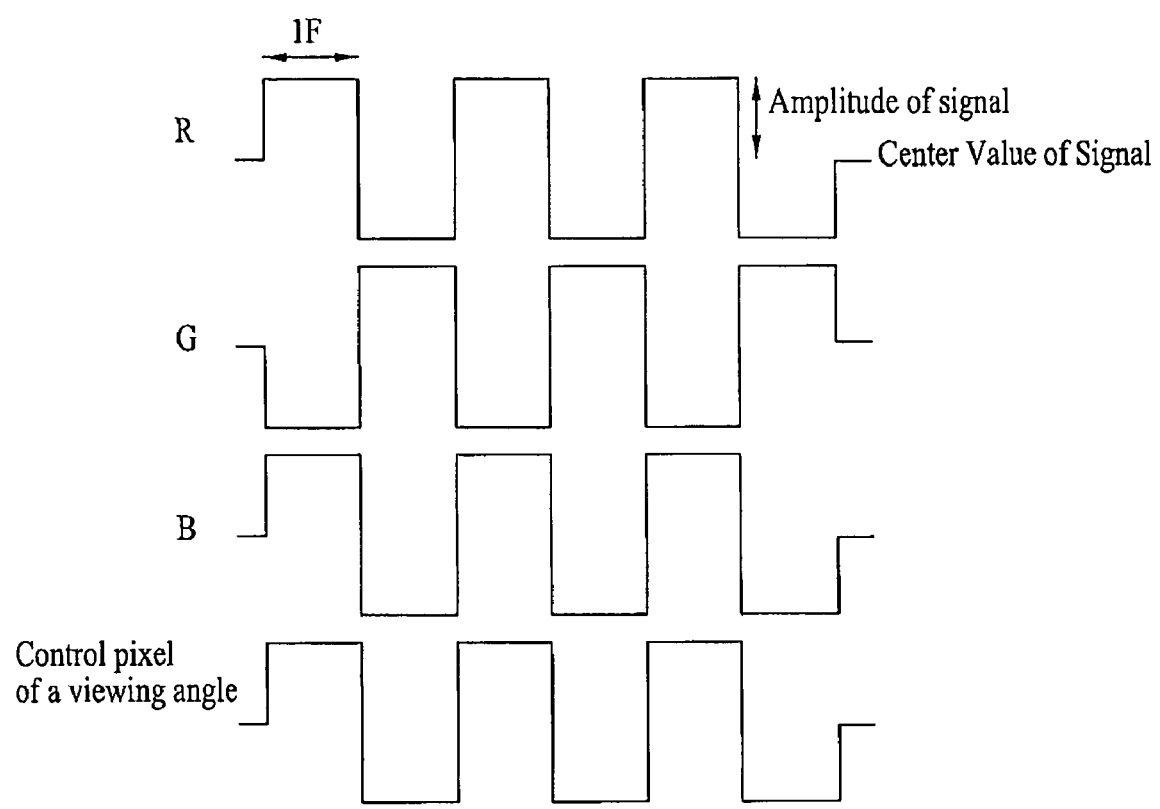
FIG. 9 is a view illustrating a wavelength of a signal line of a DOT inversion in an LCD device according to an embodiment of the present invention.

FIG. 9 is a view illustrating a wavelength of a signal line of a DOT inversion in the LCD device according to an embodiment of the present invention. FIG. 9 illustrates the wavelength of signal line of each of the RGB pixels and the viewing-angle control pixel 20.

Referring to FIG. 9, if additionally providing the viewing-angle control pixel 20, one group is comprised of four pixels including the three pixels of RGB and one pixel of the viewing-angle control pixel, which are arranged in repetition.

Accordingly, the wavelength of AC voltage in the viewing-angle control pixel corresponds to the signal for the four pixels, so that it has the same type of signal. Accordingly, the viewing-angle control voltage adjuster synchronizes the voltage signal with the control signal of the RGB pixels, and outputs the same voltage signal to all viewing-angle control pixels at the same time, thereby obtaining the simplified structure.

For the above-mentioned embodiment of the present invention, even though the viewing-angle control pixel is formed independently of the RGB pixels, it is unnecessary to independently control the viewing-angle control pixel. Thus, it is possible to fabricate the LCD device that can control the viewing angle with relative ease.

In addition, the voltage signal is applied to the viewing-angle control pixel, wherein the voltage signal has the signal center value which is substantially the same as the common voltage of the RGB pixels. Thus, the LCD device can prevent the blurring images from occurring.

Also, the same type of signal is used as the voltage signal applied to the viewing-angle control pixel, thereby obtaining the simplified structure.

A driver for the control of viewing angle based on the addition of the viewing-angle control pixel will be explained as follows.

Figure 10A:
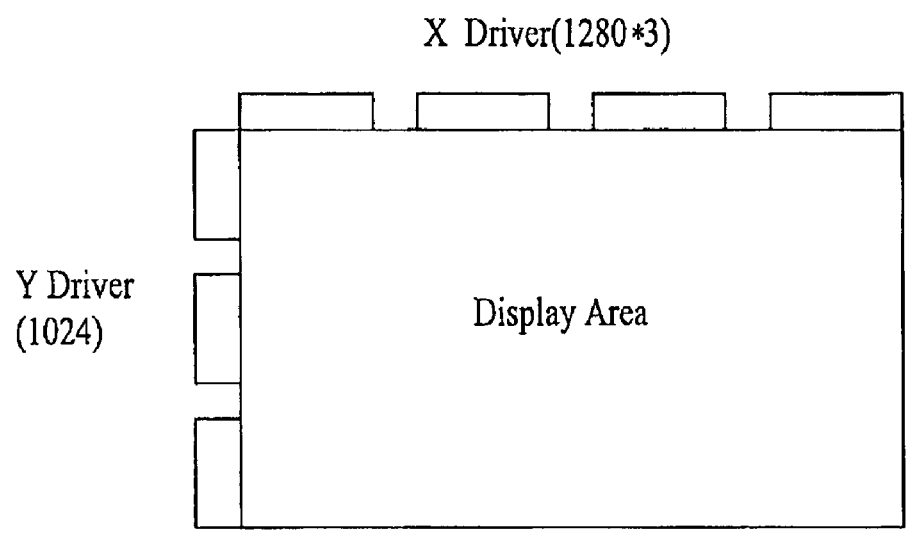
FIGS. 10A and 10B are views of explaining the addition of a driver for the control of viewing angle to an LCD device according to an embodiment of the present invention.
Figure 10B:
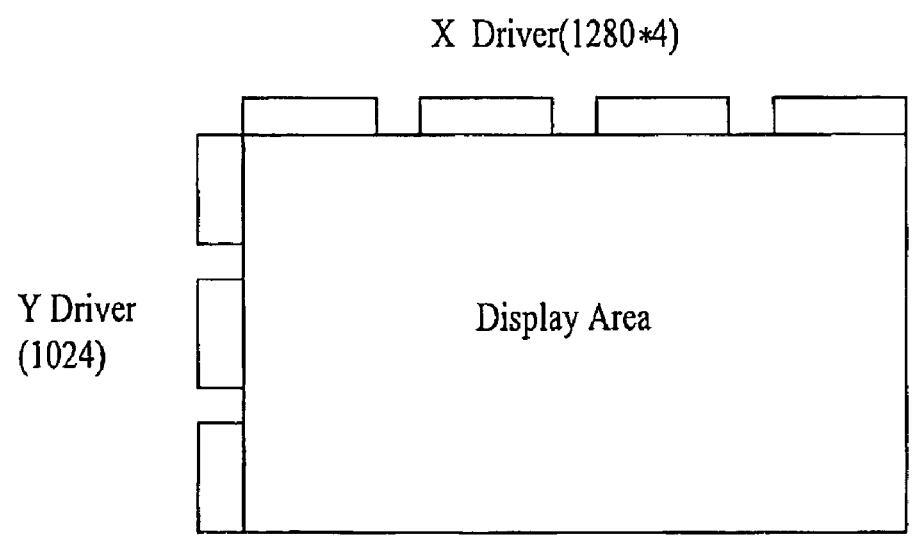
Figure 11:
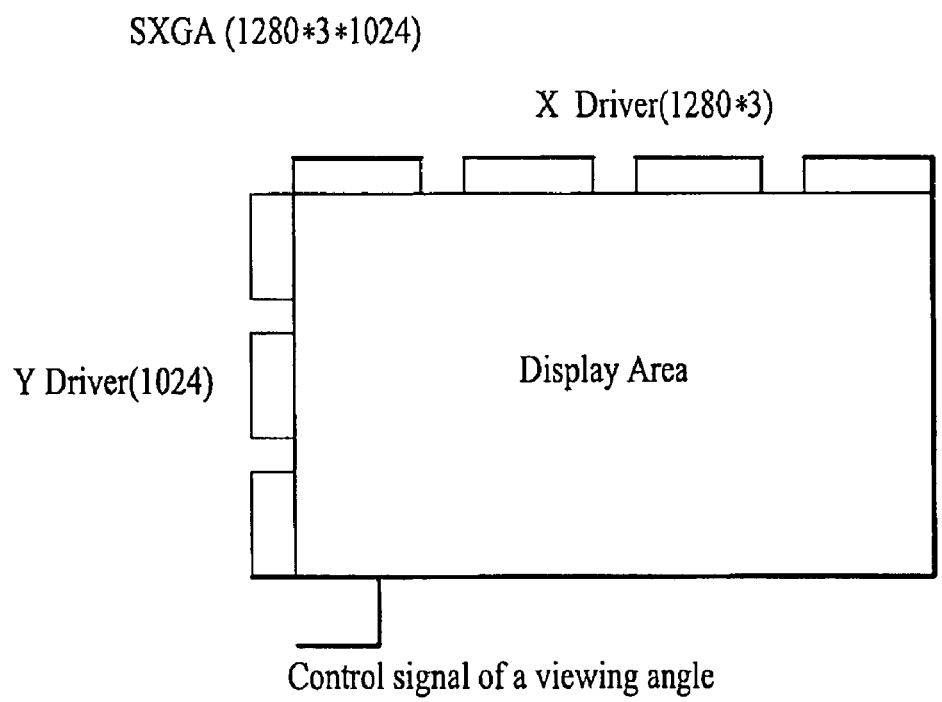
FIG. 11 is a view for explaining the addition of a driver for the control of viewing angle to an LCD device according to an embodiment of the present invention.
Figure 11:
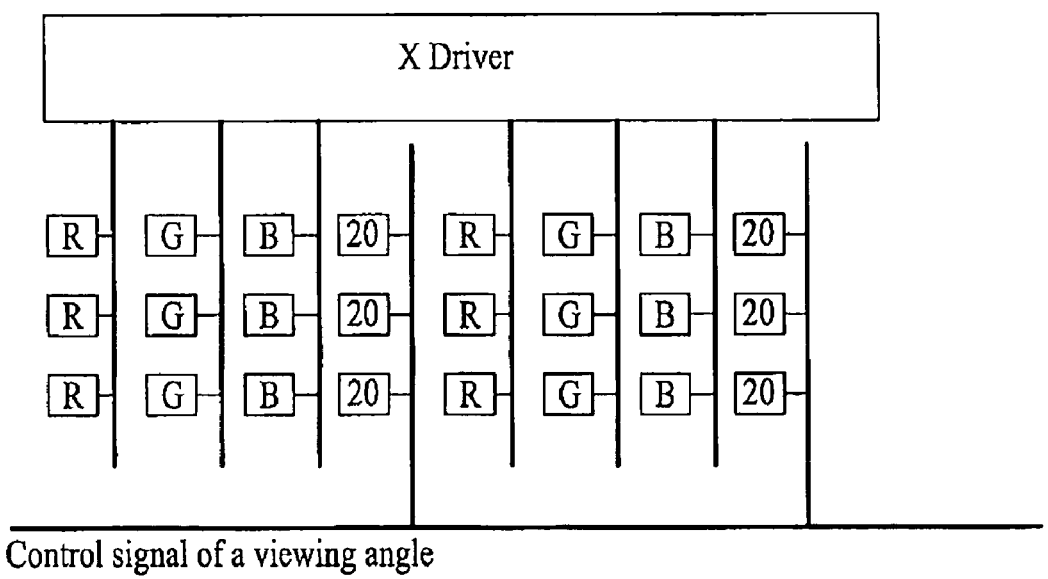

FIGS. 10A, 10B and 11 are views illustrating a driver for the control of viewing angle according to an embodiment of the present invention.

First, FIG. 10A includes RGB pixels of the related art, which illustrates the arrangement of drivers in an LCD device having a resolution of Super eXtended Graphics Array (SXGA). At this time, 'X' driver has the output of 1280 lines×RGB, and 'Y' driver has the output of 1024 lines.

FIG. 10B illustrates the arrangement of drivers when additionally providing the viewing-angle control pixel to the RGB pixels. To obtain the related art 'X' driver with the output for the viewing-angle control pixel, it is necessary to additionally provide the output for 1280 lines for the associated viewing-angle control pixels.

In the present invention, the 'X' driver for the RGB pixels may be provided without change by separately providing the output for the viewing-angle pixel at the opposite side of the 'X' driver for the RGB pixels.

By the structure illustrated in FIG. 11, the signal of the viewing-angle control pixel that may be synchronized with the signal of the RGB pixels is applied from the opposite side of the 'X' driver, where reference numeral 20 represents' the viewing-angle control pixel.

Figure 12A:
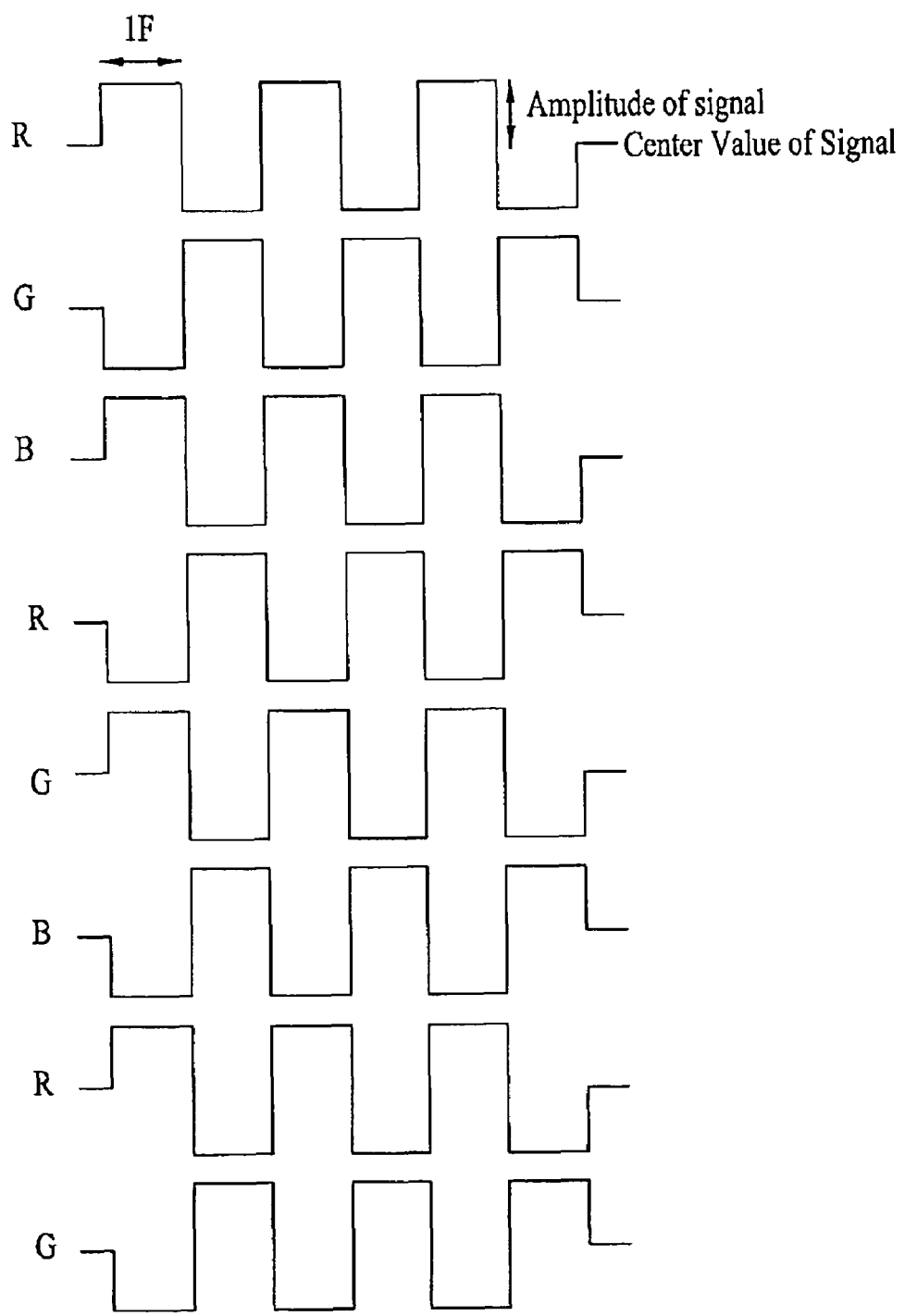
FIGS. 12A and 12B are views illustrating a wavelength of a signal line of a DOT inversion according to an embodiment of the present invention.
Figure 12B:
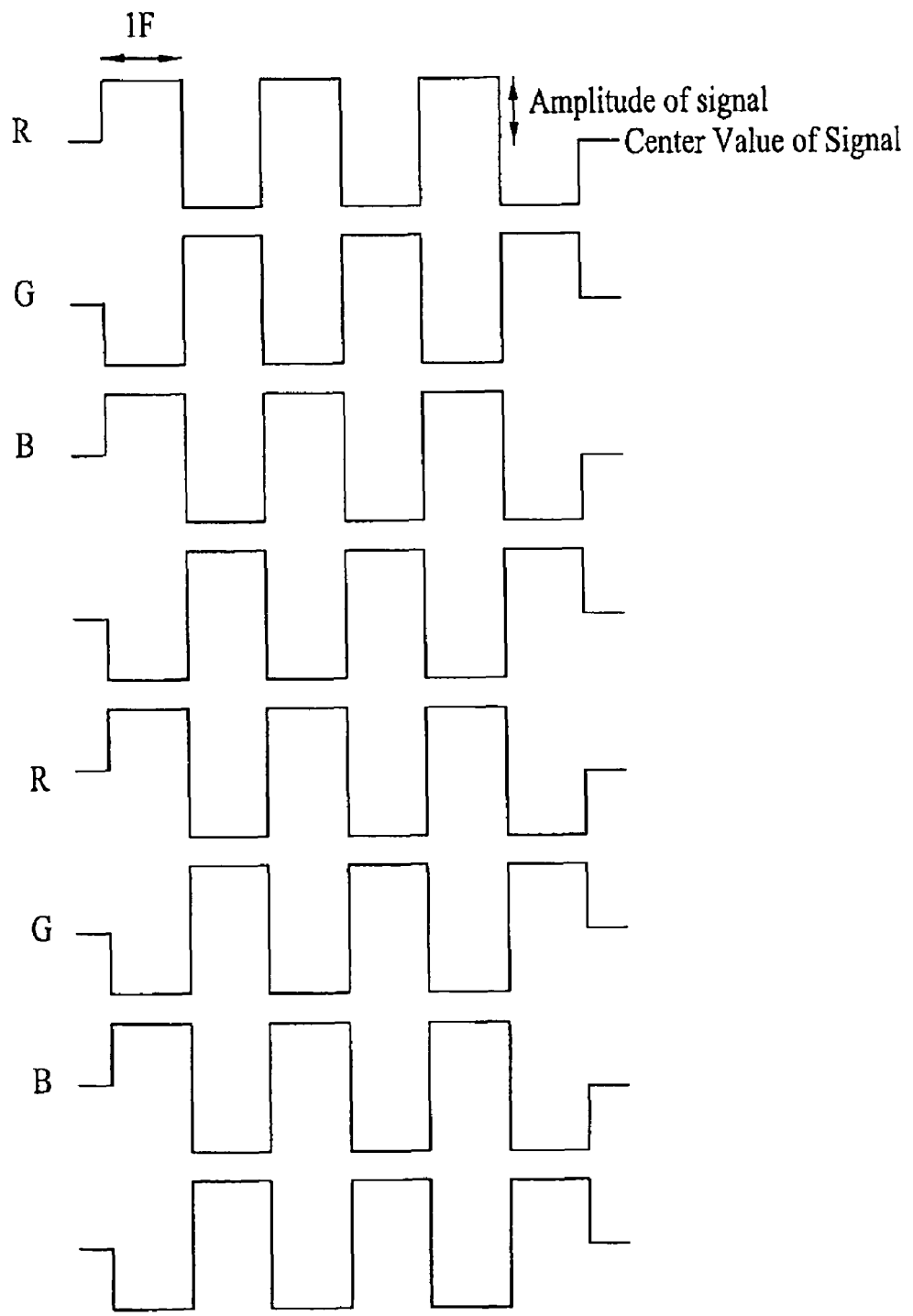
Figure 13:
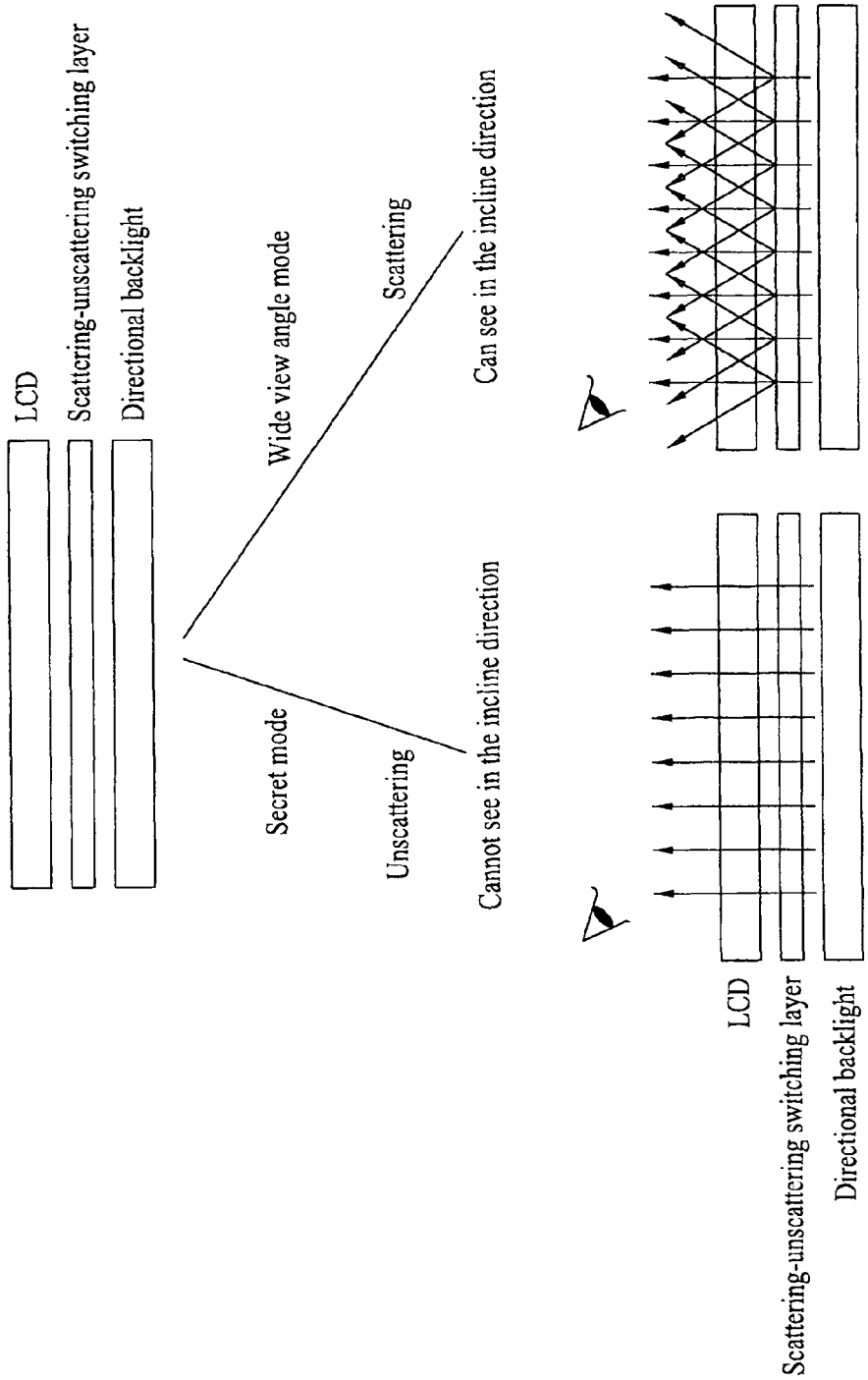
FIG. 13 is a view illustrating a related art LCD device having a secret mode.
Figure 14:
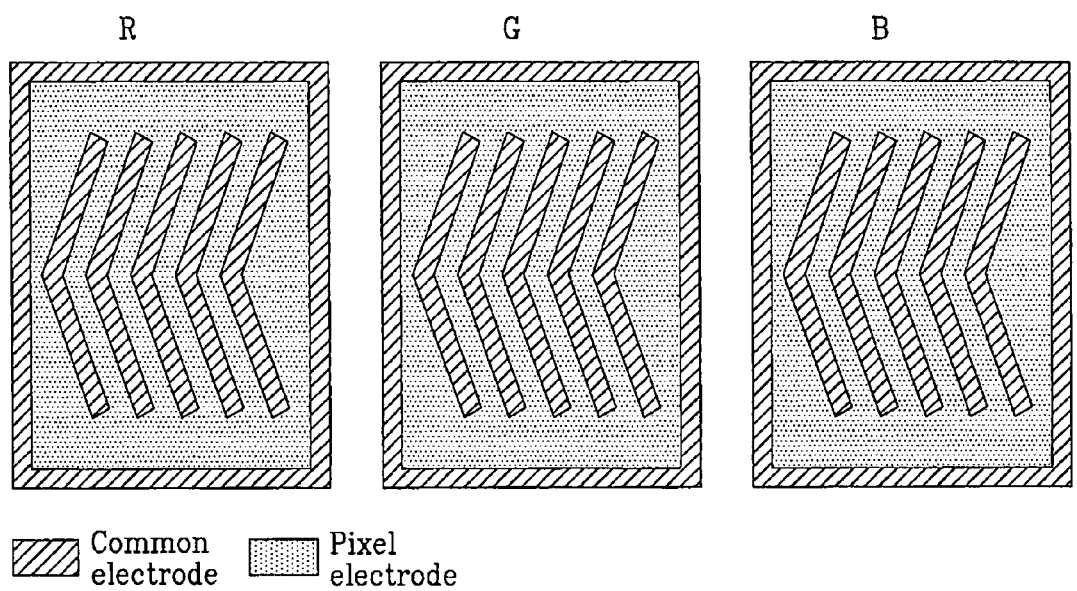
FIG. 14 is a plan view illustrating each of RGB pixels in a related art FFS mode LCD device.
Figure 15A:
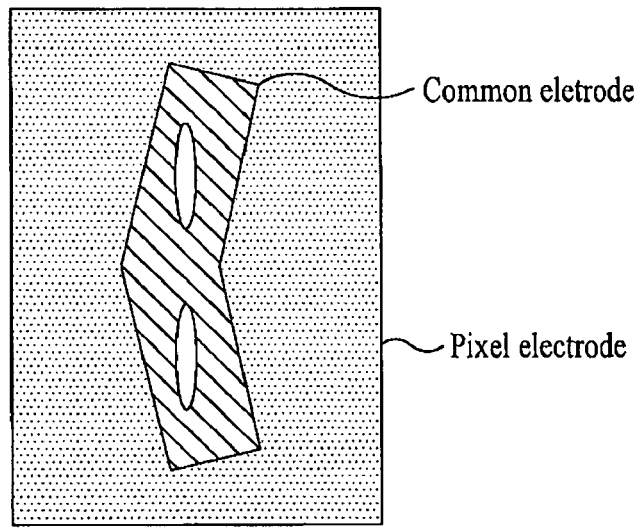
FIGS. 15A and 15B are views illustrating the operation of liquid crystal molecules when a voltage is applied to a related art FFS mode LCD device.
Figure 15B:
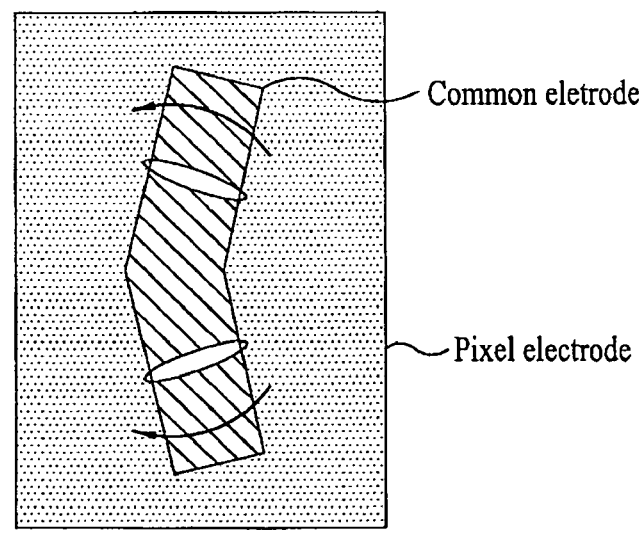

FIGS. 12A and 12B are views illustrating the wavelength of the signal line of the DOT inversion according to an embodiment of the present invention.

FIG. 12A illustrates the wavelength of the signal line in each of the RGB pixels of the related art. FIG. 12B illustrates the wavelength of the signal line in the LCD device including the viewing-angle control pixel 20 according to the present invention.

Referring to FIG. 12B, if additionally providing the viewing-angle control pixel 20, one group includes four pixels including the three pixels of RGB and one pixel of the viewing-angle control pixel, which are arranged in repetition.

Accordingly, the wavelength of AC-applying voltage in the viewing-angle control pixel corresponds to the signal for the four pixels, which have the same type of signal. Accordingly, the voltage signal applied to the viewing-angle control pixel is synchronized with the control signal of the RGB pixels, and is applied to all viewing-angle control pixels at the same time.

For the above-mentioned embodiment of the present invention, the LCD device can control the viewing angle by providing the viewing-angle control pixel which is formed independently of the RGB pixels.

In addition, the driver for the viewing-angle control pixel may be provided at the opposite side of the 'X' driver for the RGB pixels, so that it is possible to control the viewing angle without changing the arrangement of the related art 'X' driver.

Also, the same type of signal may be commonly used as the voltage signal applied to the viewing-angle control pixel, thereby obtaining the simplified structure.

The LCD device according to the present invention includes the RGB pixels where the liquid crystal molecules are inclined by the FFS mode, and the viewing-angle control pixel where the liquid crystal molecules are inclined to the horizontal (left and right) or vertical (up and down) direction, so that it is possible to control the viewing angle in the horizontal (left and right) and vertical (up and down) directions without forming the specific liquid crystal display panel.

Also, even if the viewing-angle control pixel has no switching circuit, the LCD device may prevent or minimize the blurring images from occurring without forming the specific liquid crystal display panel, and can control the viewing angle in the horizontal (left and right) and vertical (up and down) directions.

Furthermore, the driver for the viewing-angle control pixel may be provided in the opposite side to the driver for the RGB pixels, so that it is unnecessary to form the specific liquid crystal display panel. Also, the LCD device can control the viewing angle in the horizontal (left and right) and vertical (up and down) directions without changing the driver for the RGB pixels.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
    a display screen including a plurality of color pixels and viewing angle control pixels, each of the color pixels and the viewing angle control pixels including liquid crystal molecules,
    an alignment direction of the liquid crystal molecules in the viewing angle control pixels being inclined to a vertical or horizontal direction with respect to the display screen, wherein the alignment direction of the liquid crystal molecules in the viewing angle control pixels is different from the alignment direction of the liquid crystal molecules in the color pixels,
    wherein if a voltage is applied to the viewing angle control pixel, the viewing angle control pixel displays black toward a front direction and white toward left and right directions or up and down directions, so that the viewing angle control pixel provides the confidentiality of a display information, displayed by the color pixels, in the left and right directions or the up and down directions, and
    wherein if the voltage is not applied to the viewing angle control pixel, the viewing angle control pixel displays black, so that the display information displayed by the color pixels is not affected.

2. The device of claim 1, further comprising a color filter layer on a substrate over the color pixels wherein the color filter layer is not formed over the viewing-angle control pixels.

3. The device of claim 1, wherein the liquid crystal molecules in the viewing angle control pixels are aligned to form a predetermined shape in the presence of a viewing angle control signal.

4. The device of claim 1, wherein the liquid crystal molecules in the viewing angle control pixels are aligned to have a predetermined transmittance in the presence of a viewing angle control signal.

5. The device of claim 4, wherein the viewing-angle control signal is commonly applied to the plurality of viewing-angle control pixels in the display screen without a switching element.

6. The device of claim 4, further comprising a viewing-angle control voltage adjuster that adjusts a center value of the viewing-angle control signal to be substantially identical to a common voltage of the color pixels.

7. The device of claim 4, wherein the viewing-angle control signal is synchronized with a signal of the color pixel.

8. The device of claim 1, further comprising:
    a color pixel driver for applying a signal to the color pixels, and is formed at one side of the display screen; and
    a viewing-angle control pixel driver for applying a signal to the viewing-angle control pixel, and is at a side of the display screen opposite the color pixel driver.

9. The device of claim 8, further comprising a viewing-angle control voltage adjuster that adjusts a center value of the viewing-angle control signal to be identical to a common voltage of the color pixel.

10. The device of claim 8, wherein the viewing-angle control signal is synchronized with a signal of the color pixel.

11. The device of claim 1, wherein the liquid crystal display device includes a fringe field switching mode.

12. A liquid crystal display device, comprising:
    a plurality of color pixels, each color pixel including:
    liquid crystal molecules therein;
    at least one common electrode; and
    a pixel electrode;
    a plurality of viewing angle control pixels, each viewing angle control pixel including:
    liquid crystal molecules therein;
    at least one common electrode; and
    a pixel electrode;
        wherein the common electrode in the viewing angle control pixels extends in a direction different from the at least one common electrode in the color pixels such that an alignment of the liquid crystal molecules in the viewing angle control pixels is controllable in a vertical or horizontal direction,
        wherein if a voltage is applied to the viewing angle control pixel, the viewing angle control pixel displays black toward a front direction and white toward left and right directions or up and down directions, so that the viewing angle control pixel provides the confidentiality of a display information, displayed by the color pixels, in the left and right directions or the up and down directions, and
    wherein if the voltage is not applied to the viewing angle control pixel, the viewing angle control pixel displays black, so that the display information displayed by the color pixels is not affected.

13. The device of claim 12, wherein the liquid crystal molecules in the viewing angle control pixel have an initial alignment inclined in a vertical or horizontal direction.

14. The device of claim 12, wherein the liquid crystal molecules in the viewing angle control pixels move in the presence of an applied electric field to display white to a side direction.

15. The device of claim 12, wherein the liquid crystal molecules in the viewing angle control pixels move in the presence of an applied electric field to display a predetermined shape to a side direction.

16. The device of claim 12, further comprising:
    data lines and gate lines connected to the color pixels to control display of the color pixels, wherein each color pixel is connected to a respective data line and gate line through a thin film transistor as a switching device; and
    control lines connected directly to viewing angle control pixels for applying a viewing angle control signal.

17. The device of claim 16, further comprising a viewing angle control voltage adjuster that adjusts a center value of the view angle control signal to be substantially the same as a common voltage of the color pixels.

18. The device of claim 12, wherein the common electrode in the viewing angle control pixel extends in a horizontal direction.

19. The device of claim 12, wherein the common electrode in the viewing angle control pixel extends in a vertical direction.

20. The device of claim 12, wherein the common electrode in the color pixel has a "V" shape.

21. The device of claim 12, wherein the common electrode in the color pixel has a "<" shape.

22. The device of claim 12, wherein the viewing angle control pixels are aligned to form a predetermined shape in the liquid crystal display device.

23. The device of claim 22, wherein the viewing angle control pixels includes first viewing angle control pixels and second viewing angle control pixels,
  wherein the first viewing angle control pixels and second viewing angle control pixels aligned to form a predetermined shape in the liquid crystal display device.

* * * * *